US011455767B1

(12) United States Patent
Li et al.

(10) Patent No.: US 11,455,767 B1
(45) Date of Patent: Sep. 27, 2022

(54) INTELLIGENT MATERIAL COMPLETENESS DETECTION AND CONFIGURATION METHOD BASED ON DIGITAL TWIN AND AUGMENTED REALITY (AR)

(71) Applicant: ZHENGZHOU UNIVERSITY OF LIGHT INDUSTRY, Zhengzhou (CN)

(72) Inventors: Hao Li, Zhengzhou (CN); Bing Li, Zhengzhou (CN); Haoqi Wang, Zhengzhou (CN); Gen Liu, Zhengzhou (CN); Guizhong Xie, Zhengzhou (CN); Chunya Sun, Zhengzhou (CN); Rongjie Huang, Zhengzhou (CN); Xiaoyu Wen, Zhengzhou (CN); Yuyan Zhang, Zhengzhou (CN); Zhongshang Zhai, Zhengzhou (CN); Fuquan Nie, Zhengzhou (CN)

(73) Assignee: ZHENGZHOU UNIVERSITY OF LIGHT INDUSTRY, Zhengzhou (CN)

( * ) Notice: Subject to any disclaimer, the term of this patent is extended or adjusted under 35 U.S.C. 154(b) by 0 days.

(21) Appl. No.: 17/547,285

(22) Filed: Dec. 10, 2021

(30) Foreign Application Priority Data

May 19, 2021 (CN) .......................... 202110544533.6

(51) Int. Cl.
*G06T 15/00* (2011.01)
*G06T 7/50* (2017.01)
(52) U.S. Cl.
CPC .............. *G06T 15/005* (2013.01); *G06T 7/50* (2017.01)
(58) Field of Classification Search
None
See application file for complete search history.

(56) References Cited

U.S. PATENT DOCUMENTS 10,740,613 B1 8/2020 Sinclair
10,922,893 B2 2/2021 Parfenov et al.
(Continued)

FOREIGN PATENT DOCUMENTS

CN 111369670 * 7/2020 ............. G06T 15/00

OTHER PUBLICATIONS

Zhu et al., "Visualisation of the Digital Twin data in manufacturing by using Augmented Reality," Jun. 2019, Procedia CIRP, vol. 81, pp. 898-903 (Year: 2019).*

*Primary Examiner* — Andrew G Yang
(74) *Attorney, Agent, or Firm* — True Shepherd LLC; Andrew C. Cheng

(57) ABSTRACT

An intelligent material completeness detection and configuration method based on digital twin and augmented reality (AR) includes: constructing a digital twin model base and knowledge base of an incomplete material; importing the digital twin model base and knowledge base of the incomplete material respectively into a model database and a knowledge database in a digital twin system database; sending materials to be detected into a vision-based material completeness detection platform, sorting out an incomplete material, acquiring corresponding data, and importing the data into an incomplete material information database; performing, based on an AR device, perception and reconstruction of incomplete material configuration; matching a configuration plan of the incomplete material in a digital twin relational database, and performing a virtual-real fusion in the AR device; and allowing, a worker to rapidly and accurately find a location and problem type of the incomplete material and configuration the incomplete material.

7 Claims, 4 Drawing Sheets

(56) References Cited

U.S. PATENT DOCUMENTS

| | | | |
|---|---|---|---|
| 11,159,771 B2 | 10/2021 | Schmirler et al. | |
| 2019/0243343 A1* | 8/2019 | Kiefer | B23Q 7/12 |
| 2020/0386807 A1* | 12/2020 | Li | G01H 1/00 |
| 2021/0019413 A1* | 1/2021 | Deck | G06F 21/57 |
| 2021/0149380 A1* | 5/2021 | Rakshit | G06F 3/011 |

* cited by examiner

INTELLIGENT MATERIAL COMPLETENESS DETECTION AND CONFIGURATION METHOD BASED ON DIGITAL TWIN AND AUGMENTED REALITY (AR)

CROSS-REFERENCE TO RELATED APPLICATIONS

This application claims priority to Chinese Patent Application No. 202110544533.6 with a filing date of May 19, 2021. The content of the aforementioned application, including any intervening amendments thereto, is incorporated herein by reference.

TECHNICAL FIELD

The present disclosure relates to the technical field of digital and intelligent material detection, in particular to an intelligent material completeness detection and configuration method based on digital twin and augmented reality (AR).

BACKGROUND

At present, factories can hardly perform accurate completeness detection on various types of small workpieces and can hardly achieve rapid incomplete material completion. Traditional detection methods mainly rely on labors and sensors. Manual detection has low efficiency and high error rate, and commonly used sensors have low detection reliability and are easily damaged. The incomplete material configuration method mainly relies on labors. For example, in the automatic welding production line of automobiles, in order to meet the process requirements, the completeness of small parts (bolts, nuts, positioning pins, etc.) for some panels must be detected before welding. Meanwhile, it also needs to rapidly configuring the detected incomplete materials so as to reduce the defect rate and improve production efficiency.

With the continuous development of a new generation of information technology, the world's industrial powers have successively proposed new manufacturing development strategies such as "Industry 4.0" and "Made in China 2025". The main goal of these strategies is to realize cyber-physical interaction so as to realize intelligent manufacturing. Digital twin technology is an effective means to realize cyber-physical interaction. A digital twin is a digital model of a physical object. It receives data from the physical object, performs real-time evolution and feeds the results back to the physical object, thereby facilitating rapid optimization and decision-making on the physical object. The physical object and the digital twin can be deeply fused using a cyber-physical system based on digital twin technology. Augmented reality (AR) technology realizes the synchronization and fusion of virtual models and physical entities in time and space through real-time data acquisition, scene capture, real-time tracking, registration, etc., thereby providing support for the application of digital twin technology. Completeness means that a material is "complete", that is, a workpiece is not missing, and can meet the production requirements of the next process. Through digital twin technology/AR technology, the completeness of various types of small workpieces can be detected rapidly, and the incomplete material can be completed, thereby reducing the defect rate and improving production efficiency.

SUMMARY

In view of the shortcomings existing in the prior art, the present disclosure proposes an intelligent material completeness detection and configuration method based on digital twin and augmented reality (AR). The present disclosure solves the problems that at present, factories can hardly perform accurate completeness detection on various types of small workpieces and can hardly achieve rapid incomplete material completion.

The technical solution of the present disclosure is implemented as follows.

An intelligent material completeness detection and configuration method based on digital twin and AR includes the following steps:

S1: constructing a digital twin model base of incomplete material: building a three-dimensional (3D) model of a material through digital modeling software, importing the model into 3D Max for rendering, and importing the model into Unity 3d software for scene building, thereby completing the construction of the digital twin model base of the material;

S2: constructing a digital twin knowledge base of incomplete material: determining a material completeness requirement according to material types, that is, the material has no incomplete defect and meets a production requirement for a subsequent process, acquiring incomplete information of all the types, and constructing a digital twin knowledge base through the Unity 3d software; where, the incomplete information is a combination of types and locations of small parts missing from a certain material; and the digital twin knowledge base includes modules such as standard instruction diagram, voice instruction, gesture recognition and video instruction, which are constructed through the Unity 3d software;

S3: importing the digital twin model base of incomplete material in step S1 and the digital twin knowledge base of incomplete material in step S2 respectively into a digital twin model database and a digital twin knowledge database in a digital twin system database;

S4: sending materials to be detected to an automated visual detection platform, acquiring images of the materials, performing completeness detection on the materials using visual algorithms such as image preprocessing and feature point matching, and sorting out incomplete materials;

S5: recording, through an algorithm, incomplete material data (incomplete types and locations) acquired by the machine-vision detection in step S4, sorting the incomplete material data according to material types and incomplete types and locations, coding to form a three-level model tree, and setting a corresponding identification (ID) to form final incomplete material data;

S6: uploading the incomplete material data sorted in step S5 to an incomplete material information database in the digital twin system database;

S7: matching data information in the digital twin model database, the digital twin knowledge database and the incomplete material information database in the digital twin system database according to a matching rule in a digital twin relational database to obtain an configuration plan for the incomplete materials; where, the matching rule includes: allowing a material model in the model database to correspond to a configuration plan in the knowledge database and incomplete material data in the incomplete material information database, that is, to allow the material model, the configuration plan and the incomplete material data to correspond to each other, so as to form an configuration plan for the incomplete materials; and in a specific implementation, a database interface is written to match an incomplete material data ID in the incomplete material information database with incomplete material digital twin model data in the digital twin model database and incomplete material completion knowledge data in the digital twin knowledge database to obtain a corresponding configuration plan for the incomplete materials;

S8: performing AR-based material perception and reconstruction: manually configuring an incomplete material, extracting a feature of a configuration scene through an AR device, and performing material perception and reconstruction by the AR device by: identifying and tracking materials through a line of sight of human eyes, performing 3D reconstruction of incomplete materials through environment sensing cameras, and sensing, by an inertial sensor, directions of the AR cameras to calculate positions and attitudes of the AR cameras; the AR device is HoloLens glasses, which integrates one inertial sensor, four environment sensing cameras and one depth camera;

S9: inputting the configuration plan for the incomplete materials obtained in step S7 into the AR device for coordinates matching with the incomplete material configuration scene acquired by the AR-based material perception and reconstruction method in step S8; and if the match succeeds, extracting and matching image feature points of virtual-real scenes, and further correcting the positions and attitudes in fields of view of the AR cameras, such that an incomplete material configuration guide image and a real incomplete material configuration image are superimposed and displayed in the AR glasses to complete a virtual-real fusion; and S10: allowing, according to the digital twin configuration plan and an AR interactive prompt displayed on the AR device, a worker to rapidly and accurately find a location of an incomplete material, determine a problem type and rapidly configuring the incomplete material according to the prompt of the configuration plan for the incomplete materials.

The present disclosure has the following beneficial effects. By running a designed vision algorithm on an automated sorting platform, the present disclosure can accurately and rapidly perform completeness detection on various types of small workpieces, sort out incomplete materials, and combine AR technology to realize rapid incomplete material completion. Compared with the manual and sensor methods in the traditional detection technology, the present disclosure has high efficiency and high reliability, and can generate corresponding incomplete data to facilitate the completion and management of the incomplete materials. By combining the advanced AR technology, the present disclosure can improve the efficiency and accuracy of workers for completing incomplete materials, reduce the labor intensity, reduce the defect rate and improve production efficiency.

DETAILED DESCRIPTION OF THE EMBODIMENTS

The technical solutions of the embodiments of the present disclosure are clearly and completely described below with reference to the drawings. The application background of the present disclosure is as follows. In the automatic welding production line of automobiles, bolts, nuts, positioning pins and other small workpieces must be manually installed into the holes of certain panels of the front wall components. In order to meet the process requirements and reduce rework losses, it is necessary to perform incomplete detection of the panels before welding. That is, it detects whether there are missing small materials such as bolts, nuts, and positioning pins. If there is an incomplete panel, it is necessary to rapidly configuring the missing materials for the incomplete panel. It is clear that the described embodiments are merely a part, rather than all of the embodiments of the present disclosure. All other embodiments obtained by those of ordinary skill in the art based on the embodiments of the present disclosure without creative efforts should fall within the protection scope of the present disclosure.

Figure 1:
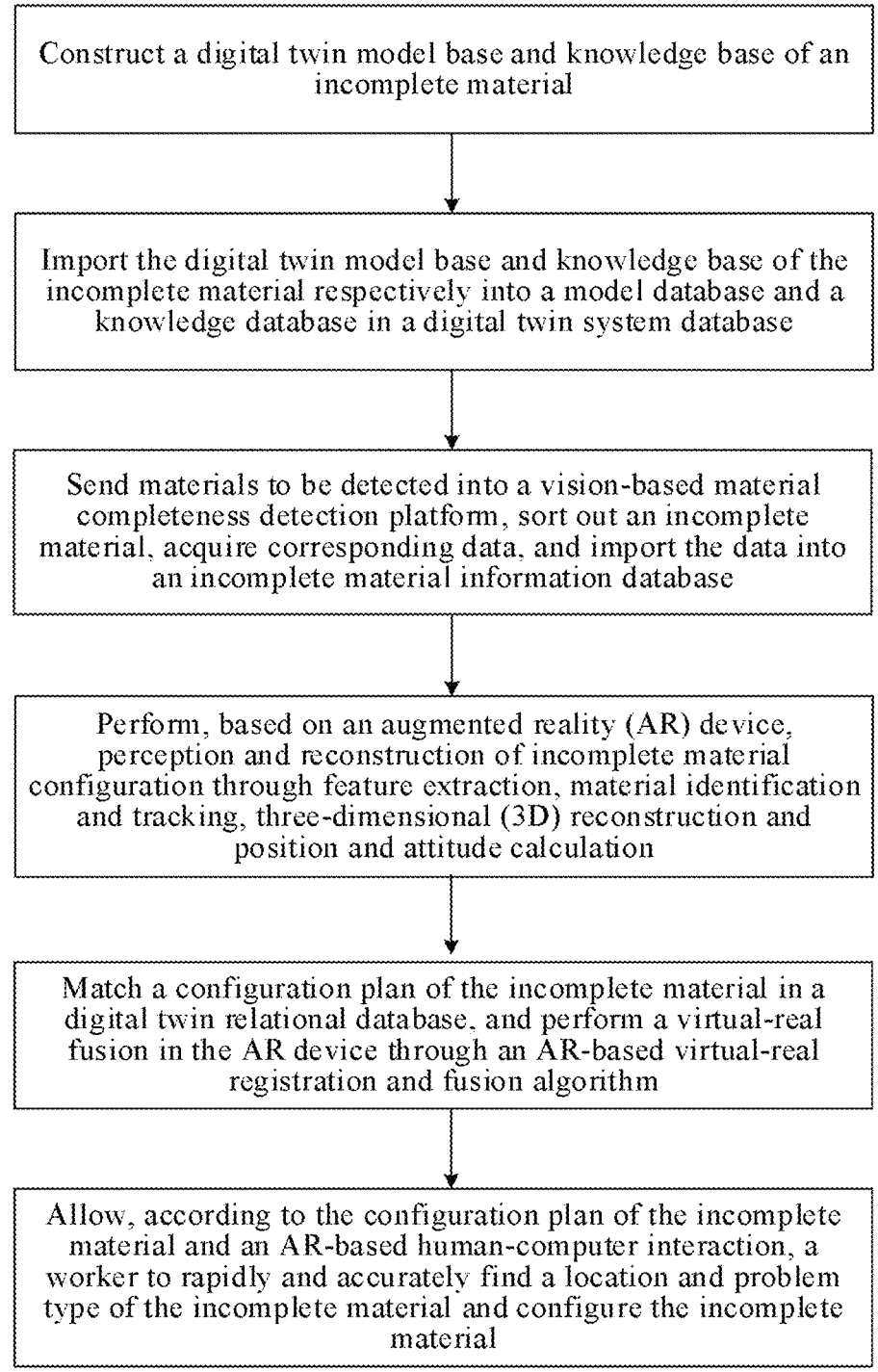
FIG. 1 is a flowchart according to the present disclosure.
Figure 2:
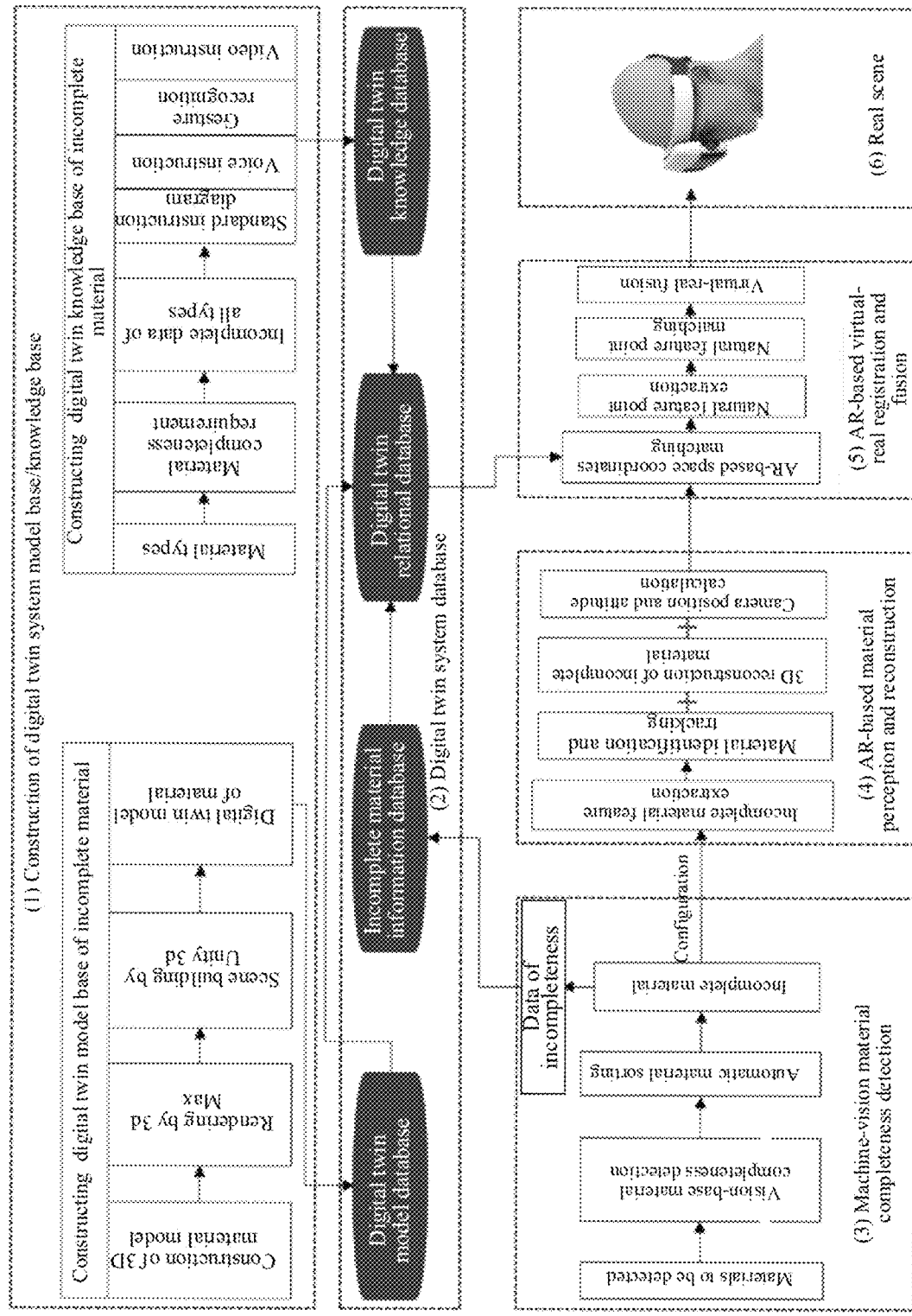
FIG. 2 is a structural view according to the present disclosure.

An embodiment of the present disclosure provides an intelligent material completeness detection and configuration method based on digital twin and augmented reality (AR). As shown in FIG. 1, the method specifically includes the following steps:

S1. A digital twin model base of incomplete panels is constructed. First, a three-dimensional (3D) model of a panel is constructed through digital modeling software (CATIA or UG). The model is imported into 3D Max for rendering and saved in . FBX format. Then the model is imported into Unity 3d software to set a corresponding scene, such that it can clearly display details of the panel such as hole positions. The settings of the scene include lighting, material, texture, color and other parameters of the panel model. The set scene file is a digital twin model of the panel. The digital twin models of all panels form a digital twin base of panels.

S2. A digital twin knowledge base of the incomplete panels is constructed. A completeness requirement is determined for panel welding according to the types of panels in front wall components, that is, the panels have no missing parts and meet a production requirement for entering a welding process. The incomplete information of all the types is acquired, including panel types and missing parts types (bolts, nuts and positioning pins) and locations. According to the incomplete information of all the types, a corresponding standard instruction diagram is plotted on the panel model. The standard instruction diagram marks the locations of the missing parts on the panel model and makes text prompts for the types of missing parts. Corresponding prompt audio is imported through Audio Listener to realize a voice instruction function. A gesture recognition function is realized by a call function RSCGO(). Recorded prompt video is imported through Video source to realize a video instruction function. The standard instruction diagrams, voice instructions, gesture recognition and video instructions of all panels form the digital twin knowledge base of the incomplete panels.

S3. The digital twin model base of the incomplete panels in step S1 and the digital twin knowledge base of the incomplete panels in step S2 are respectively imported into a digital twin model database and a digital twin knowledge database in a digital twin system database.

S4. Front wall panels to be detected are sent to an automated vision detection platform composed of a vision camera and an automatic sorting robot. The camera acquires images of each of the panels, and performs completeness detection on the panels through image preprocessing algorithms such as gray-scale processing and region of interest (ROI) extraction, and visual algorithms such as fast base for approximate nearest neighbors (FLANN) feature point matching. The sorting robot is driven to sort incomplete panels to incomplete panel carts.

S5. The types of the incomplete panels and the types (bolts, nuts, positioning pins) and locations of missing parts are recorded through the machine-vision device and algorithm in step S4. According to the types of the panels, the types (bolts, nuts and positioning pins) and locations of the missing parts, the incomplete information data is sorted and coded to form a model tree of the incomplete panels. The incomplete panels are each provided with a corresponding identification (ID) to acquire final incomplete panel data.

S6: The incomplete panel data sorted in step S5 is uploaded to an incomplete panel information database in the digital twin system database.

Figure 3:
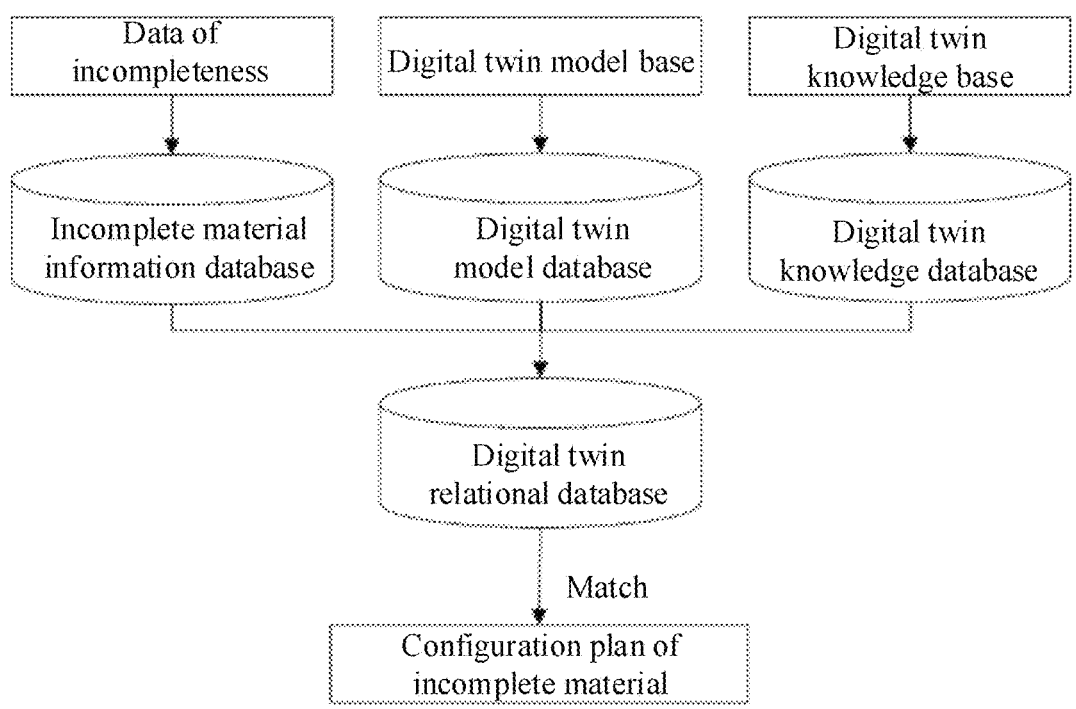
FIG. 3 is a schematic view of a digital twin system database according to the present disclosure.

S7. According to the schematic diagram of the digital twin system database shown in FIG. 3, the digital twin model data of the panels in the digital twin model database, the completion knowledge data of the incomplete panels in the digital twin knowledge database and the incomplete panel data in the incomplete panel information database are input into a digital twin relational database of the digital twin system database for matching. In a specific implementation, a database interface is written to match the incomplete panel data (i.e. ID) in the incomplete panel information database with the digital twin model data of the panels in the digital twin model database and the completion knowledge data of the incomplete panels in the digital twin knowledge database. Thus, a corresponding panel configuration guide program, which allows the panel model, the configuration plan and the incomplete panel data to correspond to each other.

S8: AR-based material perception and reconstruction. The sorted incomplete panels in the carts are manually completed. Through HoloLens glasses, feature extraction is performed on an image of a panel configuration scene, and the panel is recognized by human eyes. The AR device integrates one inertial sensor, four environment sensing cameras and one depth camera, which can perform environment perception and 3D reconstruction. The perception and reconstruction of panels by the AR device is implemented as follows. The panels are tracked through the line of sight of human eyes, the environment sensing cameras realize the 3D reconstruction of incomplete panels, and the inertial sensor senses the direction of the AR device and calculates the position and attitude of the HoloLens camera and automatically calculates the position and attitude of the HoloLens glasses in a spatial coordinate system.

Figure 4:
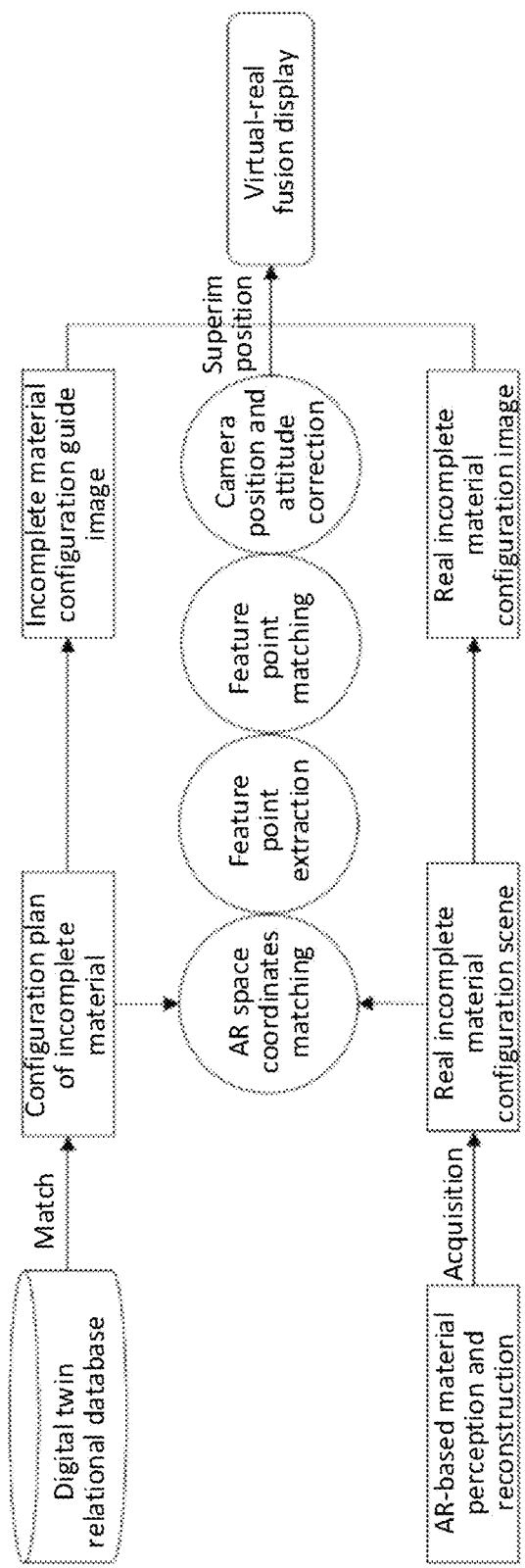
FIG. 4 is a schematic diagram of an AR-based virtual-real registration and fusion algorithm according to the present disclosure.

S9. Through an AR-based virtual-real registration and fusion algorithm as shown in FIG. 4, the incomplete panel configuration plan in step S7 is input into the HoloLens device for coordinates matching with the real incomplete panel configuration scene acquired by the panel sensing and reconstruction method in step S8. Thus, a real coordinate system matches a HoloLens camera coordinate system and a virtual environment coordinate system in the HoloLens glasses. Through algorithms such as Sift feature detection and FLAN matching, the feature points of the virtual scene in the configuration plan for the incomplete materials and the real scene image acquired in real time by HoloLens are extracted and matched. Further corrections are made to the HoloLens camera field of view, such that the incomplete panel configuration guide image and the real incomplete material configuration image are superimposed, and displayed in the AR glasses to complete the virtual-real fusion.

S10. According to the configuration plan of the incomplete panels displayed on the HoloLens device and the HoloLens interactive prompts, workers rapidly and accurately find the missing parts and locations and rapidly completion the incomplete panels, realizing the intelligent completeness detection and completion of the panels. The HoloLens interactive prompts are developed by the Unity 3D software and imported into the HoloLens glasses. For example, an interactive interface may be added through Canvas, gestures may be obtained by defining a gesture recognizer GestureRecognizerrecognizer=new GestureRecognizer(), gesture interaction may be achieved by a function recognizeizer. StartCapturing Gestures(), and language interaction may be realized through Audio Source.

The above described are merely preferred embodiments of the present disclosure, and not intended to limit the present disclosure. Any modifications, equivalent replacements and improvements made within the spirit and principle of the present disclosure should all fall within the scope of protection of the present disclosure.

The above described are merely further embodiments of the present disclosure, and the protection scope of the present disclosure is not limited thereto. Any equivalent substitutions or changes made by those skilled in the art according to the technical solutions and concepts of the present disclosure within the technical scope of the present disclosure should fall within the protection scope of the present disclosure.

What is claimed is:

1. An intelligent material completeness detection and configuration method based on digital twin and augmented reality (AR), comprising the following steps:
   S1: constructing a digital twin model base of incomplete material;
   S2: constructing a digital twin knowledge base of incomplete material;
   S3: importing the digital twin model base of incomplete material in step S1 and the digital twin knowledge base of incomplete material in step S2 respectively into a digital twin model database and a digital twin knowledge database in a digital twin system database;
   S4: sending materials to be detected to an automated visual detection platform, acquiring images of the materials, performing completeness detection on the materials using visual algorithms such as image preprocessing and feature point matching, and sorting out incomplete materials;
   S5: recording, through an algorithm, incomplete material data acquired by the machine-vision detection in step S4, sorting the incomplete material data according to material types and incomplete types and locations, coding to form a three-level model tree, and setting a corresponding identification (ID) to form final incomplete material data;
   S6: uploading the incomplete material data sorted in step S5 to an incomplete material information database in the digital twin system database;
   S7: matching data information in the digital twin model database, the digital twin knowledge database and the incomplete material information database in the digital twin system database according to a matching rule in a digital twin relational database to obtain a configuration plan for the incomplete materials;
   S8: performing AR-based material perception and reconstruction: manually configuring the incomplete materials, extracting a feature of a configuration scene through an AR device, and performing material perception and reconstruction by the AR device by: identifying and tracking materials through a line of sight of human eyes, performing three-dimensional (3D) reconstruction of incomplete materials through environment sensing cameras, and sensing, by an inertial sensor, directions of the AR cameras to calculate positions and attitudes of the AR cameras;

S9: inputting the configuration plan for the incomplete materials obtained in step S7 into the AR device for coordinates matching with the configuration scene of the incomplete material acquired by the AR-based material perception and reconstruction method in step S8; and if the match succeeds, extracting and matching image feature points of virtual-real scenes, and further correcting the positions and attitudes in fields of view of the AR cameras, such that an incomplete material configuration guide image and a real incomplete material configuration image are superimposed and displayed in AR glasses to complete a virtual-real fusion; and S10: allowing, according to the configuration plan and an AR interactive prompt displayed on the AR device, a worker to rapidly and accurately find a location of an incomplete material, determine a problem type and rapidly configuring the incomplete material according to a prompt of the configuration plan for the incomplete materials.

2. The method according to claim 1, wherein the constructing a digital twin model base of incomplete material comprises: building a 3D model of a material through digital modeling software, importing the model into 3D Max for rendering, and importing the model into Unity 3d software for scene building, thereby completing the construction of the digital twin model base of the material.

3. The method according to claim 1, wherein the constructing a digital twin knowledge base of incomplete material comprises: determining a material completeness requirement according to material types, acquiring incomplete information of all the types, and constructing a digital twin knowledge base through the Unity 3d software.

4. The method according to claim 3, wherein the incomplete information is a combination of types and locations of small parts missing from a certain material; and the digital twin knowledge base comprises modules such as standard instruction diagram, voice instruction, gesture recognition and video instruction, which are constructed through the Unity 3d software.

5. The method according to claim 1, wherein in step S4, the incomplete material data comprises incomplete types and locations.

6. The method according to claim 1, wherein in step S7, the matching rule comprises: allowing a material model in the digital twin model database to correspond to the configuration plan in the digital twin knowledge database and incomplete material data in the incomplete material information database, that is, to allow the material model, the configuration plan and the incomplete material data to correspond to each other, so as to form the configuration plan for the incomplete material; and in a specific implementation, a database interface is written to match the incomplete material data i.e. the ID in the incomplete material information database with incomplete material digital twin model data in the digital twin model database and incomplete material knowledge data in the digital twin knowledge database to obtain a corresponding configuration plan for the incomplete material.

7. The method according to claim 1, wherein the AR device is the HoloLens glasses, which integrates one inertial sensor, four environment sensing cameras and one depth camera.

* * * * *